United States Patent [19]

Ueki et al.

[11] 4,423,443

[45] Dec. 27, 1983

[54] AUTOMATIC-REVERSING TAPE DECK

[75] Inventors: Yoshiharu Ueki; Shouzaburou Sakaguchi, both of Kawagoe, Japan

[73] Assignee: Pioneer Electronic Corporation, Tokyo, Japan

[21] Appl. No.: 306,398

[22] Filed: Sep. 28, 1981

[30] Foreign Application Priority Data

Sep. 29, 1980 [JP] Japan ................................ 55-135618

[51] Int. Cl.³ ...................... G11B 15/48; G11B 17/00; G11B 19/02; G11B 15/18
[52] U.S. Cl. ...................................... 360/74.1; 360/71
[58] Field of Search ................... 360/74.1, 74.2, 74.3, 360/74.4, 71, 90, 78, 105, 96.2; 242/189, 190

[56] References Cited

U.S. PATENT DOCUMENTS

| | | | |
|---|---|---|---|
| 4,147,898 | 4/1979 | Tozune | 360/74.1 |
| 4,214,283 | 7/1980 | Fushimi | 360/71 |
| 4,270,152 | 5/1981 | Ida | 360/74.1 |
| 4,305,103 | 12/1981 | Osanai | 360/74.1 |

Primary Examiner—Robert Martin Kilgore
Attorney, Agent, or Firm—Fleit, Jacobson, Cohn & Price

[57] ABSTRACT

An automatic-reversing tape deck arranged such that the magnetic tape advancing direction is automatically reversed when the tape is wholly wound during operation and then the operation is continued with the tape being advanced in the reversed direction, in which tape-advancement-direction changing signals are repeatedly generated by a circuit if the tape gets unable to advance because of a certain failure or accident, and the tape advancing operation is stopped when several tape-advancement-direction changing signals are counted by a counter. In this tape deck, wasteful power dissipation and harmful heat generation in the mechanism for changing the tape-advancement-direction can be avoided.

2 Claims, 2 Drawing Figures

AUTOMATIC-REVERSING TAPE DECK

FIELD OF THE INVENTION

The present invention relates to a tape deck, i.e. a tape recorder-reproducer mechanism mounted on a motor board and including a tape advancing mechanism and bias and erase oscillators, particularly to an automatic-reversing tape deck in which the magnetic tape advancing direction is automatically reversed when the tape is wholly wound during operation and then the operation is continued with the tape being advanced in the reversed direction.

BACKGROUND OF THE INVENTION

In a known tape deck of the automatic-reversing type, there is provided a device for detecting the movement of a magnetic tape in the tape deck, which device is adapted to produce a stop detection signal when the tape stops. A circuit is provided which in turn is adapted to produce a direction changing signal in response to the stop detection signal. An electromagnetic actuator device including e.g. an electromagnet is provided, which is energized to change the tape advancing direction in response to the direction changing signal.

In the above-mentioned tape deck, the direction changing signal is maintained when the tape advancing direction is maintained unchanged notwithstanding the direction changing signal present, due to a certain failure in the tape deck, or when the tape happens to get twisted around a pinch roller or a capstan in operation and get unable to advance. If such failures happen to occur in the known tape deck of the automatic-reversing type, the electromagnetic actuator device for changing the tape advancing direction is maintained energized, which results in wasterful electric power dissipation in the electromagnetic actuator. Moreover, the wasteful power dissipation in the electromagnetic actuator results in thermal damage in the solenoid of the actuator, or in harmful thermal influence on the parts or members adjacent the solenoid.

SUMMARY OF THE INVENTION

An object of the present invention is to provide an automatic-reversing type tape deck in which the above-mentioned wasteful power dissipation in the electromagnetic actuator for changing the tape advancing direction can be avoided.

In order to achieve the above object, the tape deck of the present invention includes a tape advancing mechanism adapted to advance a magnetic tape in the tape deck in the forward and backward directions, the tape advancing mechanism being further adapted to change the tape advancing direction from one of the forward and backward directions to the other in response to a direction changing signal and adapted to stop advancing the tape in response to a fault detection signal; first means for detecting the movement of the magnetic tape and producing a stop detection signal when the magnetic tape stops; second means adapted to be activated by the stop detection signal for producing the direction changing signals repeatedly at a predetermined repetition period as long as the stop detection signal lasts; and third means adapted to be activated by the stop detection signal thereby to count the direction changing signals for producing the fault detection signal when it counts a predetermined number of the direction changing signals.

BRIEF DESCRIPTION OF THE DRAWINGS

The present invention will now be described, by way of example, with reference to the accompanying drawings in which.

DESCRIPTION OF THE PREFERRED EMBODIMENT

Figure 1:
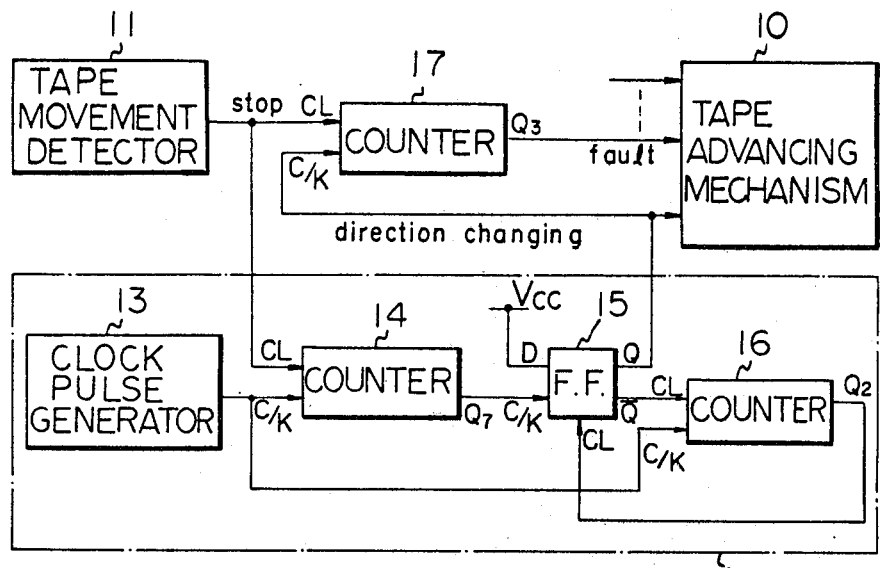
FIG. 1 is a block diagram of part of an embodiment of the tape deck according to the present invention.

Referring now to FIG. 1, there is shown part of an examplary embodiment of the tape deck according to the present invention. The tape deck of the present invention has a tape advancing mechanism 10 which is adapted to advance a magnetic tape (not shown) in the tape deck in the forward and backward directions. The tape advancing mechanism is further adapted to change the tape advancing direction from one of the two directions to the other in response to a predetermined direction changing signal and stop advancing the tape in response to a fault detection signal, both signals being described later in detail.

In the circuit arrangement shown in FIG. 1, there is provided a tape movement detecting circuit 11 which is adapted to detect the movement of a magnetic tape in the tape deck and to produce a series of pulses when the tape is advanced, and to produce a stop detection signal comprising e.g. a low level d.c. voltage when the tape stops. The output signal of the tape movement detector 11 is fed to a direction changing signal generator circuit 12 which is adapted to be activated by the stop detection signal from the tape movement detector 11 thereby to produce the direction changing signal.

The direction changing signal generator 12 comprises a clock pulse generator 13, a first counter 14, a flip flop circuit 15 and a second counter 16. The first counter 14 has a clear input CL connected to the output of the tape movement detector 11 and a count input C/K connected to the clock pulse generator 13. The counter 14 is cleared by the pulses from the tape movement detector 11 when the tape is advanced by the mechanism 10. When receiving the stop detection signal from the tape movement detector 11, the first counter 14 produces a setting signal each time it counts a predetermined number of clock pulses from the clock pulse generator 13. The flip flop 15, the set input C/K of which is connected to the output Q7 of the first counter 14, changes its state and produces the direction changing signal at its Q output in response to the setting signal from the first counter 14. The second counter 16 has a clear input CL connected to the Q output of the flip flop 15, a count input C/K connected to the output of the clock pulse generator 13, and an output Q2 connected to the reset input CL of the flip flop 15. When the flip flop 15 is set and the direction changing signal is present at the Q output thereof, the second counter 16 counts the clock pueses. The second counter 16 produces a reset signal which is transmitted to the reset input CL of the flip plop 15 thereby to reset the flip flop 15, when it has counted a predetermined number of the clock pulses.

In the circuit arrangement of the direction changing signal generator 12, the time period from the instant of generation of the stop detection signal to the instant of generation of the direction changing signal is determined by the cycle period of the clock pulses and the number of count stages of the first counter 14. In this example, the counter has seven (7) count stages. Meanwhile, the duration of the direction changing signal is determined by the cycle period of the clock pulses and the number of the count stages of the second counter 16. In this example, the second counter 16 has two (2) count stages.

The direction changing signal from the circuit 12 is fed to the tape advancing mechanism 10. As described above, energizes the above-mentioned electro-magnetic actuator of the mechanism 10 is energized thereby to reverse the tape advancing direction in response to the direction changing signal from the circuit 12.

The direction changing signal from the circuit 12 is transmitted also to a clock input C/K of a third counter 17 whose clear input CL is connected to the output of the tape movement detector 11. The third counter 17 is activated by the stop detection signal from the tape movement detector 11 thereby to count the direction changing signals repeatedly generated at a predetermined repetition period. The third counter 17 produces a fault signal when it has counted a predetermined number of the direction changing signals. In other words, the fault detection signal is generated after the lapse of a predetermined time period from the instant of generation of the stop detection signal, this time period being determined by the number of the count stages of the third counter 17 and the repetition period of the direction changing signals. In this example, the third counter 17 has three (3) count stages. The tape advancing mechanism 10 receiveds the fault detection signal from the third counter 17 and, in response to this signal, stops its tape advancing operation.

Figure 2:
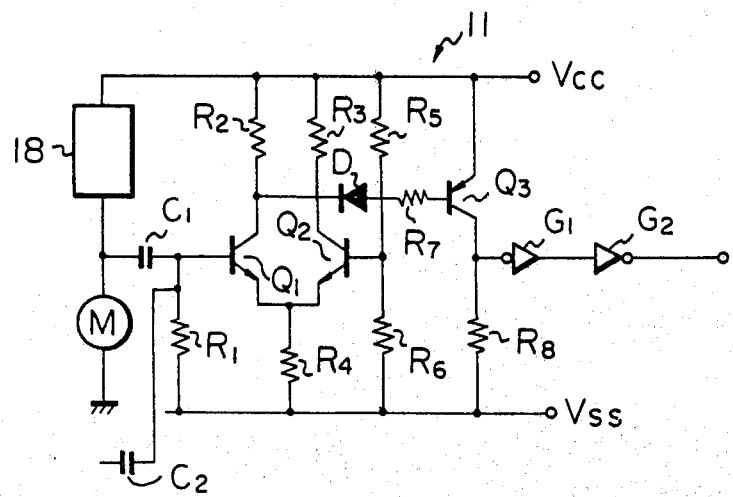
FIG. 2 is a circuit diagram of an example of tape movement detecting means to be used in the circuit arrangement as shown in FIG. 1.

Referring now to FIG. 2, there is shown an exemplary circuit arrangement of the tape movement detector 11. The circuit 11 is, in this example, connected to a direct-drive electric motor M for driving a reel (not shown) on which the magnetic tape is wound, and adapted to detect brush noises from the motor M thereby to detect the movement of the tape. The circuit 11 has a differential amplifier constituted by two transistors $Q_1$ and $Q_2$ whose emitters are connected to each other, and resistors $R_1$ to $R_6$. One input terminal of the differential amplifier i.e. the base of the transistor $Q_1$ is connected via a capacitor $C_1$ to a terminal of the motor M. The terminal of the motor connected to the capacitor $C_1$ is connected also to a power source Vcc through a motor driving circuit 18. The brush noises from the motor M is transmitted to the differential amplifier $Q_1$, $Q_2$ through the capacitor $C_1$ and amplified by the amplifier $Q_1$, $Q_2$. Brush noises from another reel driving motor (not shown) also is transmitted through another capacitor $C_2$ to the same input terminal of the differential amplifier. The tape movement detector 11 has another transistor $Q_3$ whose base is connected through a resistor $R_7$ and a diode D to the output terminal of the differential amplifier i.e. the collector of the transistor $Q_1$. The emitter of the transistor $Q_3$ is connected directly to the power source Vcc and the collector of $Q_3$ is connected through a resistor $R_8$ to another power source Vss, respectively. The transistor $Q_3$ amplifies the output of the differential amplifier $Q_1$, $Q_2$. The output terminal of the tape movement detector 11 i.e. the collector of the transistor $Q_3$ is connected to the clear inputs CL of the first and the third counters 14 and 17 through a buffer circuit constituted by two inverting amplifiers $G_1$ and $G_2$ connected in series to each other.

The operation of the device of FIG. 1 with the tape movement detector 11 as shown in FIG. 2 will now be described. When a magnetic tape is advanced by the tape advancing mechanism 10, the tape movement detector 11 produces a series of pulses at a cycle period corresponding to the rotation speed of the reel driving motor M or the tape advancement speed. The first and the third counters 14 and 17 are respectively cleared by the pulses from the tape movement detector 11 and therefore will not perform counting operation. When the magnetic tape is wholly wound and the tape is stopped, the tape movement detector 11 produces a stop detection signal of low level d. c. voltage. The first counter 14 initiates to count the clock pulses and produces a setting signal when it has counted seven (7) clock pulses. The flip flop 15 is set by the setting signal from the first counter 14 thereby to produce a direction changing signal at its Q output. The electromagnetic actuator (not shown) of the tape advancing mechanism 10 for changing the tape advancing direction is energized in response to the direction changing signal from the flip flop 15. Meanwhile, the direction changing signal is fed as a clock pulse to the third counter 17, whereby the count content of the counter 17 is increased by one (1) in number.

Under normal operating conditions, the tape advancing direction is reversed and the magnetic tape is advanced in the reversed direction in response to the direction changing signal. With the tape then being advanced in the reversed direction, the tape movement detector 11 produces again pulse signals thereby to clear the first and the third counters 14 and 17. In the case of the magnetic tape being stopped because of a certain failure or accident, for example twisting of the tape around a pinch roller or a capstan, in which the tape can not be advanced in the reversed direction, the second counter 16, as described above, counts the clock pulses when it is activated by the flip flop 15 in the set state. The second counter 16 produces a reset signal when it has counted two (2) clock pulses. The flip flop 15 is reset by the reset signal from the second counter 16 and therefore the direction changing signal disappears temporarily, with the result that the electromagnetic actuator in the tape advancing mechanism 10 is deenergized temporarily. With the magnetic tape still being unable to advance due to the failure or accident, the direction changing signal is produced each time the first counter 14 counts seven (7) clock pulses. In response to the direction changing signals, the electromagnetic actuator in the mechanism 10 is repeatedly energized at a predetermined time interval. When the magnetic tape will not initiate to advance notwithstanding three (3) direction changing signals counted by the third counter 17 the counter 17 produces a fault detection signal which is transmitted to the mechanism 10. In the case of a reel-to-reel or a cassette tape deck, the tape advancing operation is stopped in response to the fault detection signal with the capstans being disengaged from the magnetic tape and with the tape reel driving motors M being stopped. On the other hand, in the case of a cassette tape deck incorporated in a mobil stereo system, the capstans are disengaged from the tape and the tape reel driving motors M are stopped and, in addition, the cassette is ejected out of the system in response to the fault detection signal.

As will be understood from the above description, if the magnetic tape gets unable to advance when the tape is to advance or when the tape advancing direction is to be changed in the tape deck of the present invention, the electromagnetic actuator for changing the tape advancing direction is repeatedly energized and, after the lapse of a predetermined period, the whole mechanism of the tape deck is brought into its "shut off" or "eject" state. Therefore, in accordance with the present invention, wasteful power dissipation and harmful excessive heat generation in the electromagnetic actuator can be avoided.

It will be understood that the present invention is not to be limited to the exact construction shown and described and that various changes and modifications may be made without departing from the spirit and scope of the present invention as defined in the appended claims. For example, each of the three counters may have any suitable number of count stages. Furthermore, the tape movement detector may have a construction other than the construction as shown in FIG. 2; for example, a tape movement detector may comprise a magnetic sensor assembly constituted by a ring-like magnet on a tape reel, the magnet being magnetized in the radial directions, and a reed switch cooperating with the magnet to be opened and closed thereby.

What is claimed is:

1. In an automatic-reversing tape deck arranged wherein the magnetic tape advancing direction is automatically reversed when the tape is wholly wound during operation and then the operation is continued with the tape being advanced in the reversed direction, which comprises:
    (a) a tape advancing mechanism adapted to advance a magnetic tape in the tape deck in the forward and backward directions, said tape advancing mechanism being further adapted to change the tape advancing direction from one of said forward and backward directions to the other in response to a direction changing command signal;
    (b) first means for detecting the movement of the magnetic tape and producing a stop detection signal when the magnetic tape stops;
    (c) second means adapted to be activated by said stop detection signal for producing said direction changing command signals repeatedly at a predetermined repetition period as long as said stop detection signal lasts; wherein the improvement comprises:
    a counter adapted to be activated by said stop detection signal thereby to count said direction changing signals as long as said stop detection signal lasts for producing said fault detection signal when it counts a predetermined number of said direction changing signals, whereby said fault detection signal causes said tape advancing mechanism to stop the tape advancing mechanism after a certain number of direction changes.

2. A tape deck as claimed in claim 1, in which said second means for producing said direction changing signal comprises a pulse generator adapted to generate clock pulses, a first counter adapted to be activated by said stop detection signal thereby to count the clock pulses for producing a setting signal when the first counter has counted a first predetermined number of said clock pulses, a flip flop circuit adapted to be set by said setting signal from said first counter thereby to produce said direction changing signal, and a second counter adapted to count said clock pulses in the presence of said direction changing signal and reset said flip flop circuit when said second counter has counted a second predetermined number of said clock pulses.

* * * * *